Nov. 20, 1956  W. J. COLLINS  2,771,384
PROTECTIVE MATERIAL
Filed Jan. 31, 1955

*INVENTOR.*
WILLIAM J. COLLINS
BY
*Kenway, Jenney, Witter & Hildreth*
ATTORNEYS

United States Patent Office 2,771,384
Patented Nov. 20, 1956

2,771,384

PROTECTIVE MATERIAL

William J. Collins, Newton, Mass., assignor to Victory Plastics Co., Hudson, Mass., a corporation of Massachusetts Application January 31, 1955, Serial No. 484,947

3 Claims. (Cl. 154—52.5)

This invention relates to protective material and more particularly to laminated structures designed for protection of equipment and personnel against flying missiles, such as shrapnel, bullets and the like.

It is an object of this invention to provide a laminated structure suitable for incorporation into garments and other flexible protective elements having extremely high properties of absorption of kinetic energy of flying missiles. It is a further object of my invention to arrange the structure of the protective material so that it will be extremely flexible for incorporation into conventional garments, and at the same time be extremely simple in fabrication and assembly.

In a preferred embodiment of my invention, I employ a multiplicity of layers of woven nylon fabric and bond these layers together by means of a synthetic resin applied to the fabric in straight equally spaced parallel lines. The layers are bonded together in such a way that an intermediate layer is joined to the layer next above it along lines which lie substantially midway between the bond lines which join the said intermediate layer to the layer next below it. With this arrangement it will be seen that the fabric comprises a series of shallow, flat pockets lying in staggered relationship and in order to complete the combined protective structure of my invention, I insert in the outer two series of these pockets flat plates or inserts of a hard and tough fiberglass polyester laminate, known commercially as "Doron."

It is a feature of my invention that the composite structure so formed is extremely resistant to penetration of flying missiles. The "Doron" inserts cooperate with the nylon to enhance greatly the ballistic absorption properties of the structure, by promoting a cone-shaped expanding shock path as the missile commences to penetrate the structure. By widening the path of the shock wave of the missile, the extremely high energy absorption properties of the multiple layers of nylon backing fabric are fully employed and result in improved antiballistic properties.

It is a further feature of my invention that the "Doron" inserts lie in overlapping relationship and provide a protective screen which the missile cannot enter without first passing through one of the said "Doron" inserts.

An additional feature of my invention lies in the dimensional relationship of the pockets of the "Doron" inserts. The inserts are dimensioned substantially smaller than the pockets whereby the fabric immediately surrounding the inserts is permitted to shift in a minor degree to accommodate normal contours of a garment, as for instance in the area of the back or the chest. Inasmuch as the bonded backing layers likewise are permitted a substantial degree of relative shifting within themselves in the areas where said layers are not bonded together, the structure of my invention is capable of being bent and formed conveniently for incorporation into many types of garments.

These and other objects and features of my invention will best be understood and appreciated from the detailed description of a preferred embodiment of my invention, selected for purposes of illustration and shown in the accompanying drawings in which.

Figure 1:
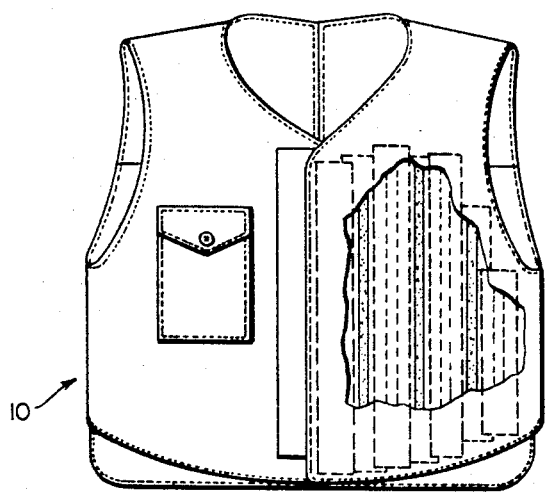
Fig. 1 is a view of the laminated structure of my invention incorporated into a garment.

The preferred embodiment of my invention comprises a laminated structure which may be employed for protecting many things. While it may be employed in curtains, sheet material, blankets or the like, I have shown it herein in Fig. 1 as employed in a protective garment 10. This garment may be a vest as is shown or may equally well comprise leggings, coats, and the like. Inasmuch as the precise form of the outer portion of the garment itself is not critical to this invention, it will not be further described in detail.

Figure 2:
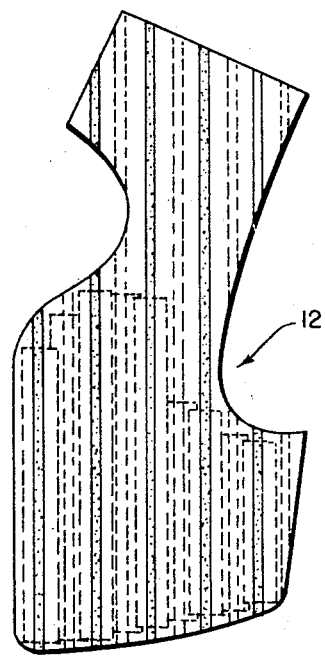
Fig. 2 is a plan view of a typical panel fabricated for purposes of incorporation into a garment.

The protective portions of the garment 10 comprise laminated panels which may be inserted between the inner and outer layers of the garment. One of these panels designated at 12 is shown in Fig. 2. Panel 12 covers one side of the breast portion of the garment 10, extends over the shoulder and covers the upper back portion of the garment 10. In the preferred embodiment of my invention, the panel 12 comprises thirteen layers designated by the reference numeral 14 of 2 x 2 basket weave high tenacity nylon fabric weighing 13 to 14 ounces per square yard. It will be understood that other forms of weave may be suitable and also certain other strong and elastic fabrics may be employed.

The layers 14 are bonded together by a bonding agent which may be a mixture of approximately equal parts of butadieneacrylonitrile copolymer (such as sold by Angier Products Co. as resin SBP–1562 or SBP–1433) and phenolic resin (such as sold by Angier Products Co. as resin SBP–1513 or SBP–1434). Another highly suitable formulation is a mixture of approximately equal parts of a phenol formaldehyde resin and polyvinyl butyral resin (safety glass grade) in a solvent of alcohol and toluene; such an adhesive resin is sold by Bakelite Corporation as resin BJ–16320, and by Industrial Tape Corporation as Permacel 1500, the resin solids content of this adhesive is about 33–37%. With the line or bar lamination pattern arrangement, herein employed, the addition of about 2 parts or less by weight of resin to each 100 parts by weight of textile material is sufficient to produce good anti-ballistic results.

Figure 3:
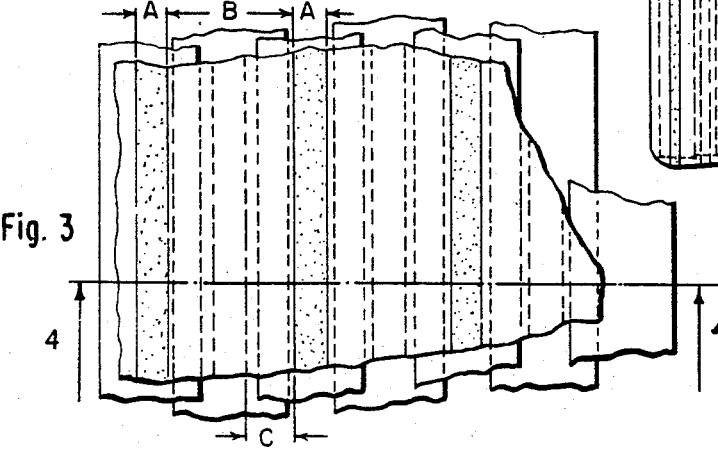
Fig. 3 is an enlarged plan view of the portion shown in Fig. 2.

The layers 14 are bonded with the above said resin along lines or bars 16 which extend the length of the fabric and which occupy approximately 20% of the surface area of one side of the layers 14. It will be understood that the outer layers 14 are only bonded on one surface thereof, while the intermediate layers 14 are bonded on each side thereof. However, regarding only one side of a layer 14 to which the resin is applied, it will be seen that approximately 80% of the surface area is free of resin. The areas of application of resin designated at 16 in the preferred embodiment of my invention are ½" wide which dimension is designated by the letter B in Fig. 3. It will also be seen in Figs. 3 and 4 that the resin is applied to succeeding layers in similar straight and parallel bars 16 but that the areas are disposed in staggered relationship. Thus a given intermediate layer will have a pair of resin bars 16 spaced 2" apart on its upper surface and half-way between the two said bars on the upper surface, the said intermediate layer 14 will have a resin bar 16 on its under surface. With this structure it will now be seen that an absolutely resin-free path extends the full length of the fabric having a transverse dimension designated by the letter C in Fig. 3. In this preferred embodiment the dimension C is ¾".

With this structure it will be seen that a multiplicity of longitudinally extending pockets 18 pass directly through the fabric and lie in overlapping and staggered relationship from layer to layer. In this preferred embodiment of my invention, I place flat plates or inserts 20 in the outer two series of the pockets 18. The plates 20 may preferably comprise a tough durable substance such as fiberglass polyester laminate, known as "Doron." This substance is highly resistant to the passage of flying missiles, such as shrapnel, bullets and the like, and furthermore by promoting a cone-shaped shock path tends to distribute the impact of the missiles over a widened portion of the backing nylon layers 14. With the reference to Fig. 4 it will be seen that the inserts 20 do not occupy the entire pocket 18, but instead permit a certain amount of lateral play between the layers 14 and the inserts 20 immediately adjacent thereto. Thus the structure may be conveniently bent around corners to conform to the shape of a garment or the like. Furthermore, since the layers 14 back of the outer layers are permitted a still wider degree of relative motion, any rigidity in the outer layers caused by the insertion of the "Doron" plates 20 is largely taken up by the cushioning effect of the layers 14 and their freedom to accommodate new shapes adjacent to the inner surface of the structure.

Figure 4:
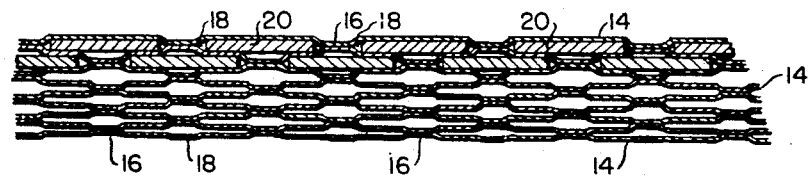
Fig. 4 is a cross-sectional view of the portion of the panel shown in Fig. 3 on the line 4—4 of Fig. 3.
Figure 5:
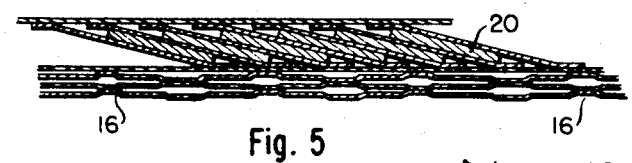
Fig. 5 is a cross-sectional view in a corresponding location showing an alternative construction.

It will be seen in Fig. 4 that the plates 20 lie in overlapping relationship, and therefore, a missile cannot penetrate the structure without passing through at least one of these inserts 20. On the other hand, it may be desirable to overlap the inserts 20 in fish scale fashion as may be seen in Fig. 5.

Thus it will be seen that the structure of my invention herein shown may be fabricated rapidly by mass production bonding techniques and the placing of the inserts 20 in the pockets 18 may be accomplished by simply opening the pocket and sliding the insert in.

Since numerous minor variations of the preferred embodiment of my invention herein shown will be obvious to those skilled in the art, it is not my intention to confine this invention to the precise form or garment herein shown, but rather to limit it in terms of the appended claims.

Having thus described and disclosed a preferred embodiment of my invention, what I claim as new and desire to secure by Letters Patent of the United States is:

1. A protective structure comprising a multiplicity of layers of fabric bonded together along straight and parallel lines in staggered relation with a given intermediate layer being bonded to the layer next above it along lines substantially midway between the lines along which the said intermediate layer is bonded to the layer next below, thereby forming pockets between the said layers disposed in staggered relation, the said bond lines being substantially narrower than the distance between the same on each side of each layer whereby said pockets substantially overlap, and overlapping inserts of hard sheet material located in the outer series only of said pockets and cushioned by the inner layers of the structure.

2. A protective structure comprising a multiplicity of layers of fabric bonded together along straight and parallel lines in staggered relation with a given intermediate layer being bonded to the layer next above it along lines substantially midway between the lines along which the said intermediate layer is bonded to the layer next below, thereby forming pockets between the said layers disposed in staggered relation, the said bond lines being substantially narrower than the distance between the same on each side of each layer whereby said pockets substantially overlap, inserts of hard sheet material located in the outer series only of said pockets in overlapping relation, and said inserts being substantially smaller than said pockets whereby to permit relative motion between the fabric of said layers and the said inserts while the inserts are cushioned by the pockets formed in the inner layers of the structure.

3. The protective structure defined in claim 2 further characterized by said inserts comprising a hard substance having the characteristics of polyester impregnated fiberglass laminate whereby to promote a cone-shaped expanding impact pressure path and thereby to distribute the stress of impact through an expanding area of said layers lying inwardly of said inserts.

References Cited in the file of this patent

UNITED STATES PATENTS

| | | |
|---|---|---|
| 1,603,424 | Spooner | Oct. 19, 1926 |
| 2,142,463 | Upson | Jan. 3, 1939 |
| 2,526,291 | Spooner | Oct. 17, 1950 |
| 2,608,502 | Merriman | Aug. 26, 1952 |
| 2,640,987 | Ehlers | June 9, 1953 |
| 2,697,054 | Dietz et al. | Dec. 14, 1954 |
| 2,723,214 | Meyer | Nov. 8, 1955 |